(12) United States Patent
Kestermann et al.

(10) Patent No.: US 8,723,465 B2
(45) Date of Patent: May 13, 2014

(54) BLADE PITCH CONTROLLING DRIVE FOR A WIND TURBINE

(75) Inventors: Hermann Kestermann, Rheine (DE); Josef Upsing, Rheine (DE); Norbert Wibben, Salzbergen (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 19 days.

(21) Appl. No.: 13/260,462

(22) PCT Filed: Jan. 25, 2010

(86) PCT No.: PCT/EP2010/050810
§ 371 (c)(1),
(2), (4) Date: Sep. 26, 2011

(87) PCT Pub. No.: WO2010/108704
PCT Pub. Date: Sep. 30, 2010

(65) Prior Publication Data
US 2012/0032627 A1    Feb. 9, 2012

(30) Foreign Application Priority Data

Mar. 27, 2009  (DE) .......................... 10 2009 003 691

(51) Int. Cl.
*H02K 17/32* (2006.01)
*H02P 9/04* (2006.01)

(52) U.S. Cl.
USPC ................. 318/434; 318/400.15; 318/400.22; 290/44

(58) Field of Classification Search
USPC ............... 318/400.15, 400.21, 430, 432, 434; 323/217, 219; 290/44
See application file for complete search history.

(56) References Cited

U.S. PATENT DOCUMENTS 8,242,619 B2 *  8/2012  Arinaga et al. ................. 290/44
2004/0145188 A1 *  7/2004  Janssen et al. .................. 290/44

(Continued)

FOREIGN PATENT DOCUMENTS

DE        103 35 575 A1     3/2005
DE    20 2005 012040 U1   11/2005

(Continued)

OTHER PUBLICATIONS

International Search Report (in German with English Translation) and Written Opinion (in German) for PCT/EP2010/050810, mailed Feb. 7, 2011; ISA/EP.

*Primary Examiner* — Eduardo Colon Santana
*Assistant Examiner* — Bickey Dhakal
(74) *Attorney, Agent, or Firm* — Harness, Dickey & Pierce, P.L.C.

(57) ABSTRACT

The invention relates to a blade pitch controlling drive for a wind turbine, comprising an electrical converter, an electric motor that is electrically coupled to the converter, a monitoring unit operable to monitor an electric output current supplied by the converter to the electric motor and determine a state of the load on the converter as a function of the electrical output current, a current limiting unit operable to reduce a maximum possible output current to a nominal current when the state of the load is an overload state when the nominal current when in a non-overload state, and a peak current control unit that can be activated. When activated, the peak current may be provided as the maximum possible output current, regardless of the load state of the inverter at the time of the activation.

14 Claims, 4 Drawing Sheets

(56) References Cited

U.S. PATENT DOCUMENTS

| | | |
|---|---|---|
| 2007/0024227 A1 | 2/2007 | Kunkel et al. |
| 2007/0247091 A1* | 10/2007 | Maiocchi ................. 318/254 |
| 2008/0277938 A1* | 11/2008 | Oohara et al. ............ 290/44 |
| 2008/0298784 A1* | 12/2008 | Kastner .................... 388/811 |
| 2009/0001726 A1 | 1/2009 | Warfen et al. |
| 2010/0207397 A1 | 8/2010 | Kestermann et al. |

FOREIGN PATENT DOCUMENTS

| | | |
|---|---|---|
| DE | 10 2006 009127 A1 | 9/2007 |
| DE | 102007021632 | 11/2008 |
| EP | 1739807 A2 | 1/2007 |

\* cited by examiner

BLADE PITCH CONTROLLING DRIVE FOR A WIND TURBINE

CROSS-REFERENCE TO RELATED APPLICATIONS

This application is a 371 U.S. National Stage of International Application No. PCT/EP2010/050810, filed Jan. 25, 2010, and claims priority to German patent application No. 10 2009 003 691.1 filed Mar. 23, 2009, the disclosures of which are herein incorporated by reference in their entirety.

The invention relates to a blade pitch controlling drive for a wind turbine, having at least one electrical converter, at least one electric motor electrically coupled to the converter which is or can be fed by the converter, at least one monitoring unit by means of which the electrical output current supplied by the converter to the electric motor is or can be monitored and a state of the load on the converter is or can be determined as a function thereof, and at least one current limiting unit by means of which the maximum possible output current is or can be reduced to a nominal current when the converter is in an overloaded state, which nominal current is less than a peak current which the converter provides or can provide as a maximum possible output current when in a non-overloaded state. The invention also relates to a method of controlling a converter of a blade pitch controlling drive of a wind turbine.

DE 20 2005 012 040 U1 discloses an electrical arrangement for controlling the pitch of rotor blades which has a constant-current source plus voltage limiting means to feed an inverter and a link circuit unit at the same time, either a storage-battery storage means, comprising a decoupling member and a storage battery, or a link-circuit capacitor being used as desired. The current-voltage characteristic of the constant current source is set in such a way by the current limiting means that the link-circuit unit is called upon and acts as a sink for the electrical energy fed back from the rotor of the wind turbine only in the event of the mains supply being interrupted or if there are brief high loads on the motor.

DE 10 2006 009 127 A1 describes a wind turbine having a rotor having rotor blades whose pitch can be altered by means of a pitch control arrangement, a positioning motor which is connected to a pitch circuit and an emergency circuit being provided for pitch control, the rotor blades being actuated by means of the pitch circuit in a normal mode and by means of the emergency circuit in an emergency mode, and the emergency circuit having a storage means for electrical energy, a switching arrangement, connecting lines to the positioning motor, and a protective arrangement. The protective arrangement comprises a power-flow detector module which is designed to determine whether electrical power is flowing into or out of the positioning motor, and also a load-shedding module which is designed to limit the voltage and/or current in the emergency circuit if there is a flow of power out of the positioning motor.

In wind turbines, drives having converters are use as pitch drive systems to control the position of the rotor blades. The drive systems may be produced in this case both on a d.c. basis, comprising a d.c. converter and a d.c. motor (a series-wound motor, a shunt-wound motor or even a compound-wound motor) and on an a.c. basis, comprising a frequency converter (with or without a vector-controlled control system) and a three-phase motor (an asynchronous motor or synchronous motor). In self-commutated converters having a d.c. link circuit, a storage battery or capacitor is coupled to the link circuit by diodes for buffering during voltage fluctuations or transient voltage dips. The energy required can thus be drawn from the storage batteries in situations like this.

So that the maximum current carrying capacity of the converters is not exceeded, the current at the time is monitored. The permitted current limit of the converters is, in particular, so designed that a dynamic peak current is permitted for a defined time, after which a reduction is made to a nominal current which is less than the peak current.

When d.c. drives are used, the motor is connected directly to a storage battery via switching contacts for emergency travel towards the safe position (the feathered position of the blades). In the case of a.c., a converter is thus required to give an assurance of the requisite emergency travel towards the safe position. This concept is increasingly being used in a similar way for d.c. drives, because the need for the switching is thus dispensed with.

The dynamic peak current is available from the converters for a specified time (depending on the actual value and the base load), this time applying when there is no base load. A reduction is then made to the continuous current (nominal current) which has been set. The level and duration of this are preset at fixed values. Furthermore, the monitoring of the current takes place by means of a so-called Ixt calculation.

Hence, given an appropriate base load and a current drain at the time, it may happen that the converter will permit only the nominal current. Depending on the load torque, this may result in the motor affected failing to reach the speed demanded, which may even go as far as the drive stopping, which may result in dangerous asymmetries in the rotor blade positions. In such an eventuality, the emergency travel is finally triggered by means of a master monitoring system.

The object underlying the invention is thus to refine a blade pitch controlling drive of the kind specified in the opening paragraph in such a way that it is possible to largely ensure that the motor operates properly even when there is a base load on the converter.

This object is achieved in accordance with the invention by a blade pitch controlling drive as claimed in claim 1 and by a method as claimed in claim 10. Preferred refinements of the invention are specified in the dependent claims.

The blade pitch controlling drive according to the invention for a wind turbine has at least one electrical converter, at least one electric motor electrically coupled to the converter which is or can be fed by the converter, at least one monitoring unit by means of which the electrical output current supplied by the converter to the electric motor is or can be monitored and a state of the load on the converter is or can be determined as a function thereof, at least one current limiting unit by means of which the maximum possible output current is or can be reduced to a nominal current when the converter is in an overloaded state, which nominal current is less than a peak current which the converter provides or can provide as a maximum possible output current when in a non-overloaded state, and at least one activatable additional unit by the activation of which the peak current is or can be provided as a maximum possible output current, regardless of the state of the load on the converter at the time of the activation. In particular, the peak current can be provided as a maximum possible output current as a result of the activation for a defined period of time or for at least one defined period of time.

The activation of the additional unit ensures that the peak current can be or is still provided, in particular for a defined period of time, even when, due to the load state, it can no longer be provided if there is no activation, or when it can be provided in this way only for a period of time which is shorter than the defined period of time. Hence, the motor can continue to be operated properly in many situations in which, without the additional unit, it would have stopped or would have been operated at a reduced speed.

The activation may take place internally and/or externally in or of the converter. External activation is performed by, for example, a control system which controls the converter, the blade pitch controlling drive and/or the wind turbine. The peak current is preferably one and one-half times or/to twice the nominal current.

When the converter is in a non-overloaded state, the output current preferably is or can be limited to the peak current by means of the current limiting unit. In particular, the state of the load on the converter may represent an overloaded state, an unloaded state and/or a loaded but not overloaded state of the converter.

A load signal characteristic of the state of the load on the converter at the time preferably is or can be determined by means of the monitoring unit. In particular, the load signal at any point in time always represents only one of the load states.

The value of the load signal may preferably be reset to a value characteristic of the unloaded state as a result of the activation. This reset is performed in particular by the additional unit. The resetting of the load signal in particular deletes the previous history of the load on the converter so that the peak current is or can be provided, preferably for a period of time or at least one period of time which corresponds in particular to the defined period of time. With regard to the load on the converter, the load signal, when reset, preferably represents a state where the blade pitch controlling drive has only just been switched on. By the resetting of the load signal it is possible for the peak current to be provided in situations in which a reduction would normally have had be made to the nominal current in the light of the previous history of the load on the converter.

To enable any damage to the converter caused by the repeated resetting of the load signal to be avoided, a lower limit is preferably set for the interval of time between successive activations. The minimum interval of time between two immediately succeeding activations is, in particular, at least one minimum period of time.

The load signal is preferably not only dependent on the present load on the converter but also on a previous load thereon. The overloaded state is characterised by for example a first value whereas the unloaded state is characterised by for example a second value which differs from the first value and is in particular less than the first value. As a function of the base load on the converter, the value of the load signal thus corresponds to the first value, the second value or a third value lying between the first value and the second value which is also referred to as an intermediate value. The second value is preferably zero.

The monitoring unit may be produced in analogue and/or digital form. In a refinement of the invention, the monitoring unit comprises a series circuit of a capacitor and a resistor to which a voltage proportional to the output current is or can be applied, the load signal being formed from the voltage applied to the capacitor. Activation of the additional unit then takes place as a result of, for example, a discharge of the capacitor.

In an alternative refinement of the invention, a digital computer is provided which forms all of part of the monitoring unit. In one embodiment of the invention the computer simulates, or is able to simulate, numerically a series circuit of a capacitor and a resistor to which a voltage proportional to the output current is or can be applied, the load signal being formed from the voltage applied to the capacitor, which voltage is or can be determined by means of the computer. The voltage proportional to the output current and the voltage applied to the capacitor are in particular numerical values from the numerical simulation of the series circuit in this case.

Each of the units may take a wholly or partly analogue and/or digital form. The additional unit and/or the current limiting unit as well are preferably thus wholly or partly formed by the computer.

However, what may also be used or numerically simulated to produce the monitoring unit is some other numerical method or some other electronic circuit which, in relation to the converter, is able to represent an unloaded state, an overloaded state and preferably also at least one intermediate state which in particular represents a loaded but not overloaded state of the converter and thus preferably lies between the unloaded and overloaded states of the converter.

There is preferably provided at least one rotor blade coupled to the electric motor which can be turned on a rotor-blade axis by means of the electric motor. The coupling between the electric motor and the rotor blade is preferably performed mechanically.

The invention also relates to a wind turbine having a mounting on which there is mounted to be rotatable on a rotor axis a rotor driven or able to be driven by the wind which has a rotor hub and a plurality of rotor blades which are each mounted on the rotor hub in such a way as to be able to be turned on a rotor-blade axis, and having a blade pitch controlling system which has, for each rotor blade, a blade pitch controlling drive according to the invention by means of which the respective rotor blade can be turned on its rotor-blade axis. Each rotor blade is preferably coupled in this case to the electric motor of the respective blade pitch controlling drive. Each of the blade pitch controlling drives may have the refinements of all the embodiments which have been described in this connection.

The number of rotor blades is preferably at least two or at least three. In particular, the number of rotor blades is three. Each of the rotor-blade axes extends in particular at right angles or obliquely to the rotor axis.

The invention also relates to a method of controlling a converter of a blade pitch controlling drive of a wind turbine, at least one electric motor electrically coupled to the converter being fed by the converter, the electrical output current supplied by the converter to the electric motor being monitored and a state of the load on the converter being determined as a function thereof, the maximum possible output current being reduced to a nominal current when the converter is in an overloaded state, which nominal current is less than a peak current which the converter provides as a maximum possible output current when in a non-overloaded state, and the peak current being provided as a maximum possible output current in response to an activation regardless of the state of the load at the time of the activation. In particular, the peak current may be provided as a maximum possible output current in response to the activation for a defined period of time or for at least one defined period of time.

The method according to the invention is preferably carried out using the blade pitch controlling drive according to the invention, thus enabling the method to have the refinements of all the embodiments which have been described in this connection. The feature of the peak current being provided as a maximum possible output current need not necessarily result in its being the peak current which actually flows as an output current. It is however possible for this to be the case.

The state of the load on the converter preferably represents an overloaded state of the converter, an unloaded state of the converter or a loaded but not overloaded state (intermediate state) of the converter. A load signal characteristic of the state of the load on the converter at the time is preferably determined, the value of the load signal being reset by the activation in particular to a value characteristic of the unloaded state.

In a refinement of the invention, a voltage proportional to the output current is applied to an actual or a numerically simulated series circuit of a capacitor and a resistor, the load signal being formed from the voltage applied to the capacitor.

The reduction or limiting of the maximum possible output current to the nominal current when the converter is in the overloaded state is preferably performed by the current limiting unit. Also, the output current and the state of the load are preferably monitored or in other words determined by the monitoring unit. The resetting of the load signal to the unloaded state is preferably performed by the additional unit. The rotor blade is preferably turned on a rotor-blade axis by means of the electric motor.

The invention will be described below by reference to a preferred embodiment and to the drawings. In the drawings.

Figure 1:
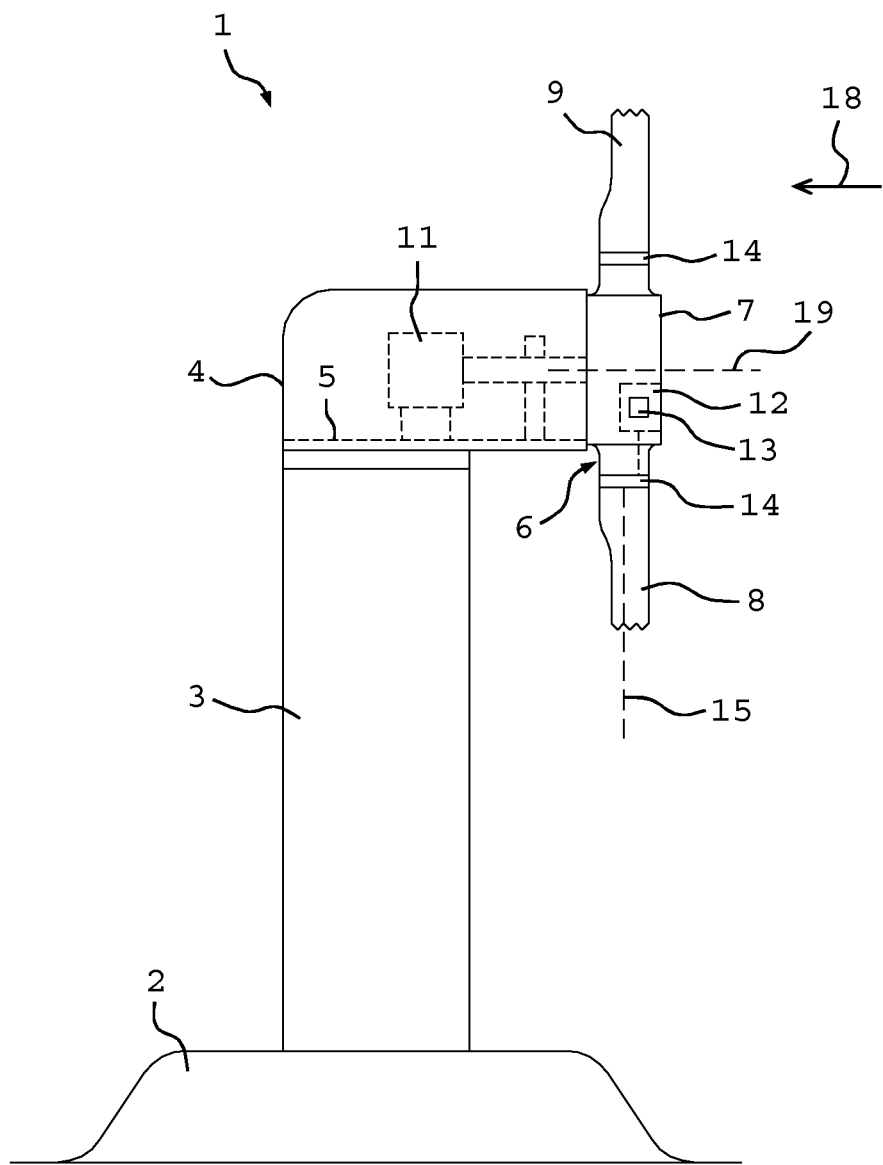
FIG. 1 is a schematic representation of a wind turbine.

There can be seen in FIG. 1 a schematic view of a wind turbine 1 which comprises, standing on a foundation 2, a tower 3 at whose end remote from the foundation 2 is arranged a machinery nacelle 4. The machinery nacelle 4 has a mounting (support) 5 on which a rotor 6, which comprises a rotor hub 7 and a plurality of rotor blades 8, 9 and 10 connected thereto (see also FIG. 7), is rotatably mounted. The rotor 6 is mechanically coupled to an electric generator 11 which is arranged in the machinery nacelle 4 and which is fastened to the support 5.

Figure 7:
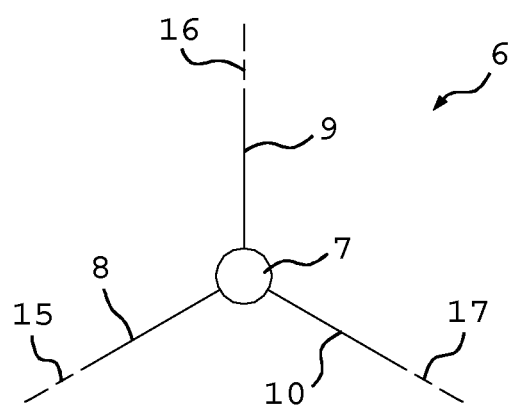
FIG. 7 is a schematic head-on view of the rotor of the wind turbine.

Arranged in the rotor 6 is a blade pitch control system 12 which, in one embodiment of the invention, has blade pitch controlling drives 14, comprising converters 13, by means of which the rotor blades 8, 9 and 10 can be turned relative to the rotor hub 7 on their respective longitudinal axes (rotor-blade axes) 15, 16 and 17 (see also FIG. 7). The rotor is rotated on a rotor axis 19 by the power of the wind 18.

FIG. 7 is a schematic head-on view of the rotor 6, thus enabling the three rotor blades 8, 9 and 10 to be seen.

Figure 2:
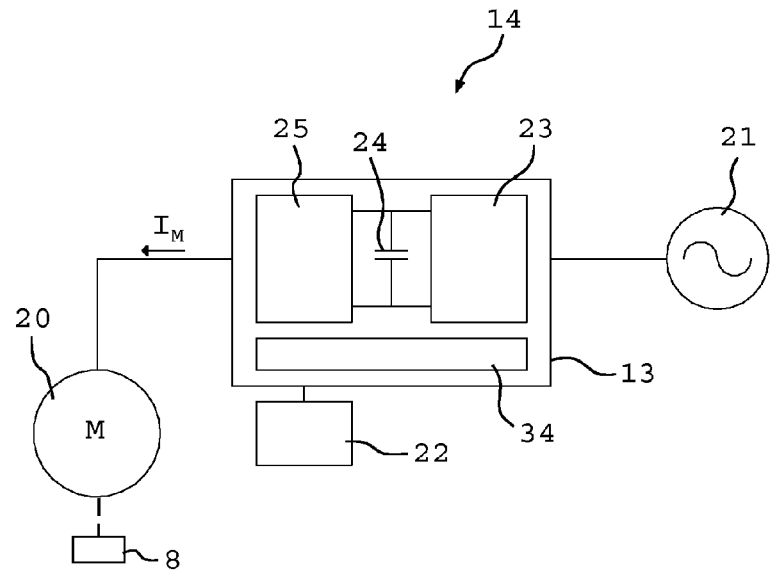
FIG. 2 is a schematic block circuit diagram of a blade pitch controlling drive.

FIG. 2 is a schematic block circuit diagram of one of the blade pitch controlling drives 14 of the rotor-blade pitch controlling system 12, an electric motor 20, which takes the form of a d.c. motor in this case, being coupled electrically to one of the converters 13 which is connected to an electrical supply system 21 and which is fed therefrom. The converter 13 is also connected to a control system 22 by means of which the converter 13 is controlled. The converter 13 comprises a rectifier 23, a link circuit having a capacitor 24, and a d.c. current setter 25. The motor 20 is mechanically coupled to the rotor blade 8, which can be turned on the rotor-blade axis 15 by means of the motor 20.

Figure 3:
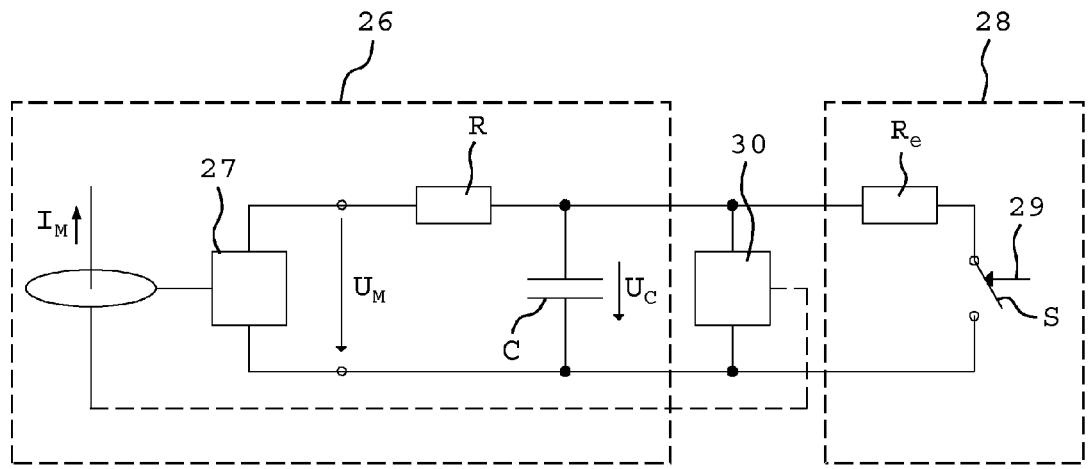
FIG. 3 is a schematic block circuit diagram of a monitoring unit.

As can be seen from FIG. 3, the converter 13 comprises a monitoring unit 26 which has a series circuit of a resistor R and a capacitor C to which is applied a voltage UM proportional to the motor current (output current) IM, which voltage UM is determined by means of an ammeter 27. The voltage UC applied to the capacitor forms a load signal which is characteristic of the load on the converter 13. Connected in parallel with the capacitor C is a series circuit of a discharge resistor Re and a switch S, the capacitor C being able to be discharged by closing the switch C. The circuit of the discharge resistor Re and the switch S thus forms an additional unit 28 by means of which the capacitor C can be discharged and the load signal UC can thus be reset to an unloaded state. The switch S can be closed to discharge the capacitor C by means of an activating signal 29 and may for example take the form of a relay or transistor. The activating signal 29 thus serves to activate the additional unit 28 and is or can be emitted by, in particular, the control system 22 in the present case. The resistor Re is preferably of a low resistance to enable discharge of the capacitor C to take place quickly. As an alternative, the switch S is connected directly in parallel with the capacitor C, thus dispensing with the resistor Re.

Figure 4:
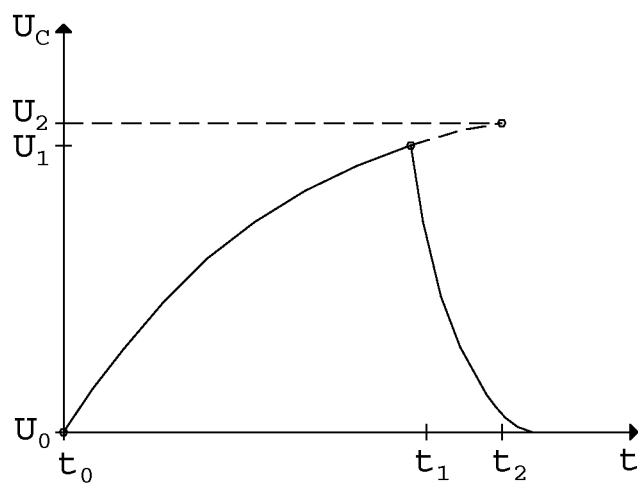
FIG. 4 shows a schematic waveform of the load signal.
Figure 5:
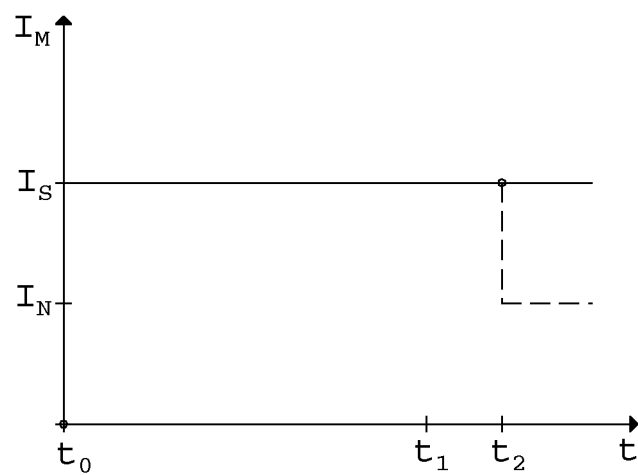
FIG. 5 shows a schematic waveform of the motor current.

Plotted in FIG. 4 by way of example, against time t, is a waveform of the load signal UC, with U0 indicating the unloaded state of the converter 13 at time t0. What is flowing continuously in this case as a motor current IM is a maximum permitted peak current IS, thus causing the capacitor C to be charged and the voltage UC to rise. At a time t1, the switch S is closed and the capacitor C is discharged, the load signal UC thus again approaching the unloaded state U0. The peak current IS thus continues to flow, which can be seen from FIG. 5 in which a waveform of the motor current IM is plotted against time t. At the switching time t1, the voltage UC is of a value U1 which is characteristic of a loaded state of the converter 13. The value U1 lies between the value U0 for the unloaded state of the converter 13 and a value U2 which is characteristic of an overloaded state thereof. The result for a permitted load state of the converter 13 of which the value UB is characteristic is thus U0≤UB<U2, the converter 13 being able to provide the peak current IS in the permitted load state. The threshold value voltage U2 characteristic of the overloaded state of the converter 13 is shown in FIG. 4.

It will be assumed in what follows that the switch S is not closed at time t1, and, as the peak current IS continues to flow, the voltage UC thus reaches the threshold value U2 (shown by a dashed line in FIG. 4) at a time t2, which results in an immediate reduction in the output current IM to a nominal current IN (shown by a dashed line in FIG. 5) which is less than the peak current IS. This reduction of the motor current IM to the nominal current IN is performed by a current limiting unit 30 which is shown schematically in FIG. 3. The monitoring unit 26, the additional unit 28 and the current limiting unit 30 are combined schematically into a block 34 in FIG. 2.

Figure 6:
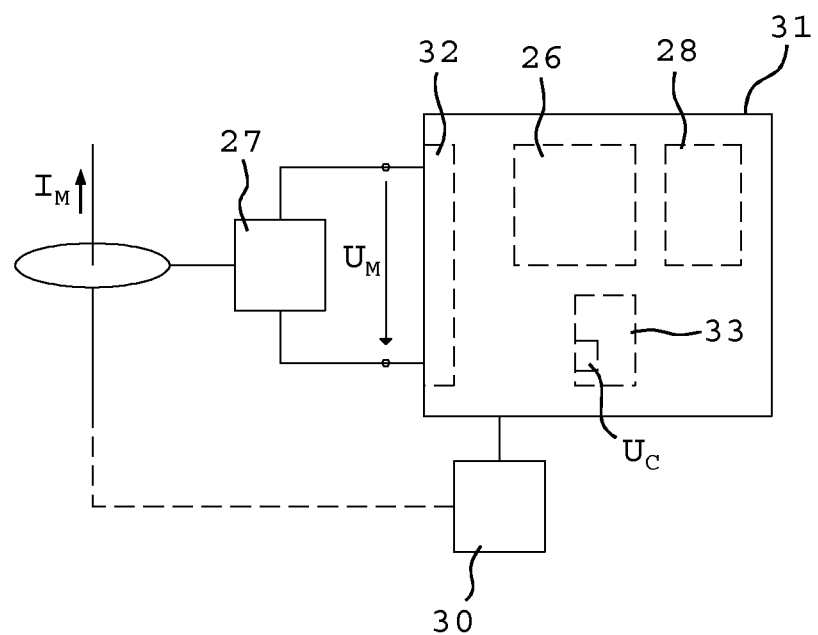
FIG. 6 is a schematic representation of an alternative form of the monitoring unit.

In FIG. 6 can be seen an alternative implementation of the monitoring unit 26, which in this case is formed by a digital computer 31. The voltage UM determined by means of the ammeter 27 is digitised in an analogue-to-digital converter 32 and is processed by the digital computer 31. In this case the monitoring unit 26 is implemented in a numerical form as a program running on the digital computer 31, the load signal UC thus being a value which is stored in a memory 33. The resetting of the load signal UC can be performed by overwriting the location in the memory 33 which is assigned to the value of the load signal UC, in particular with the value U0 which is for example zero. The additional unit 28 is also implemented as a part of the program run on the digital computer 31. In the event of an overload on the converter 13 being sensed (UC≥U2), the digital computer 31 actuates the current limiting unit 30 in the appropriate way.

The invention claimed is:

1. A blade pitch controlling drive for a wind turbine comprising:
   an electrical converter;
   an electric motor electrically coupled to the converter;
   a monitoring unit operable to monitor an electrical output current supplied by the converter to the electric motor and determine a load signal characteristic of a state of the load on the converter at a given time as a function of the electrical output current, wherein the load signal is dependent on the present load on the converter and on a previous load thereon;
   a current limiting unit operable to reduce a maximum possible output current to a nominal current when the load signal takes a value characteristic of an overloaded state of the converter, wherein the nominal current is less than a peak current provided by the converter as a maximum possible output current when in a non-overloaded state; and
   a peak current control unit selectively operable to override the current limiting unit in reducing the maximum possible output current, and to implement resetting the value of the load signal to a value characteristic of an unloaded state of the converter so as to provide the peak current as the maximum possible output current, regardless of the state of the load on the converter upon activation of the peak current control unit.

2. The blade controlling drive according to claim 1, wherein the peak control unit is selectively operable over a defined period of time resulting in the peak current being provided as a maximum possible output current.

3. The blade pitch controlling drive according to claim 1, wherein the current limiting unit is selectively operable to limit the maximum possible output current to the peak current when the converter is in the non-overloaded state.

4. The blade pitch controlling drive according to claim 1, wherein the state of the load on the converter is selected from the group consisting of an overloaded state of the converter, an unloaded state of the converter and a loaded but not overloaded state of the converter.

5. The blade pitch controlling drive according to claim 1, wherein the monitoring unit comprises a series circuit of a capacitor and a resistor to which a voltage proportional to the output current is applied, wherein the load signal is based on the voltage applied to the capacitor.

6. The blade pitch controlling drive according to claim 1, further comprising a digital controller which forms at least a part of the monitoring unit to digitally simulate a series circuit of a capacitor and a resistor to which a voltage proportional to the output current may be applied, in which the load signal is formed from the voltage applied to the capacitor, wherein the voltage is determined by means of the digital controller.

7. The blade pitch controlling drive according to claim 1, further comprising at least one rotor blade mechanically coupled to the electric motor so that the at least one rotor blade can be turned on a rotor-blade axis by means of the electric motor.

8. The blade pitch controlling drive according to claim 6, wherein the digital controller includes at least one of the peak current control unit and the current limiting unit.

9. A method of controlling a converter of a blade pitch controlling drive for a wind turbine comprising:
   monitoring an electrical output current supplied by the converter to an electric motor;
   determining a load signal characteristic of a state of the load on the converter at a given time based on the electrical output current from the converter wherein the load signal is dependent on the present load on the converter and on a previous load thereon;
   using a current limiting unit to reduce a maximum possible output current to a nominal current when the load signal takes a value characteristic of an overloaded state of the converter, wherein the nominal current is less than a peak current provided by the converter as a maximum possible output current when in a non-overloaded state; and
   using a peak current control unit to selectively override the current limiting unit from reducing the maximum possible output current, and to implement resetting the value of the load signal to a value characteristic of an unloaded state of the converter, thereby providing the peak current as the maximum possible output current, regardless of the state of the load on the converter.

10. The method according to claim 9, wherein the peak current is provided as a maximum possible output current for a defined period of time.

11. The method according to claim 9, wherein the state of the load on the converter is selected from the group consisting of an overloaded state of the converter, an unloaded state of the converter or a loaded but not overloaded state of the converter.

12. The method according to claim 9, applying a voltage proportional to the output current a series circuit of a capacitor and a resistor, the load signal resulting from the voltage applied to the capacitor.

13. The method according to claim 9 further comprising digitally simulating the series circuit to determine the load signal.

14. The method according to claim 9, further comprising turning a rotor blade on a rotor-blade axis by means of the electric motor based on the electrical output current.

* * * * *